UNITED STATES PATENT OFFICE.

JAMES HANSOR, OF WANDSWORTH ROAD, ENGLAND.

GAS-MAKING PROCESS.

Specification forming part of Letters Patent No. 16,591, dated February 10, 1857.

*To all whom it may concern:*

Be it known that I, JAMES HANSOR, of the Wandsworth Road, in the county of Surrey, England, practical chemist, a subject of the Queen of Great Britain, have invented an Improved Compound Applicable to the Manufacture of Illuminating-Gas; and I do hereby declare that the following is a full and exact description of my said invention.

This invention relates to the preparation of a compound to be used in place of coals in gas-making, the object being to produce a rich illuminating-gas which will not require to be submitted to the complex process of purifying at present employed in the manufacture of coal-gas, which process, from the necessity for great experience in the operator, as well as from its involving the employment of several purifying-vessels, is fatal to the introduction of coal-gas making as a domestic manufacture. To obviate these inconveniences and at the same time to provide an economical substitute for bituminous coals, I have invented the following compound, which possesses a plastic character and admits of being placed upon trays in thin layers and so presented to the heat of the gas-generating apparatus, in which it will be quickly vaporized and converted into gas.

The substances which I employ to form my improved compound are peat, resin, coal-tar, and resin-oil, or other oleaginous matter. These I combine in the following proportions, viz: peat, twelve parts by weight; resin of commerce, twelve parts; coal-tar, eight parts, and resin-oil, or other oleaginous matter, sixteen parts.

For the purpose of mixing the substances I use an ordinary pug-mill, and I thus produce a pasty compound of the consistency of stiff mortar ready for conversion into gas in the apparatus for which Letters Patent of the government of Great Britain were granted to me on the 21st day of March, A. D. 1854, and for which I have made application for Letters Patent of the United States, the material being introduced into the retort upon shallow trays. The compound may, however, be advantageously employed with other arrangements of gas apparatus.

I would remark that, as this compound is calculated to yield a far richer gas than that obtained from coals, it is requisite to employ in the burning of the gas such burners as will admit of a large supply of oxygen to the flame, or otherwise a considerable portion of unconsumed carbon would be evolved in the form of soot, to the great loss and inconvenience of the consumer.

Having now set forth the nature and object of my invention, I wish it to be understood that I claim—

The treatment of the compound gas-fuel made in the manner described and worked in the retorts in the manner set forth.

In witness whereof I, the said JAMES HANSOR, have hereunto set my hand and seal the 25th day of September, in the year of our Lord 1856.

J. HANSOR. [L. S.]

Witnesses:
W. A. WALKDEN,
C. J. WINTERSGILL,
*Clerks to Newton & Son, 66 Chancery Lane, London.*